FIG_1
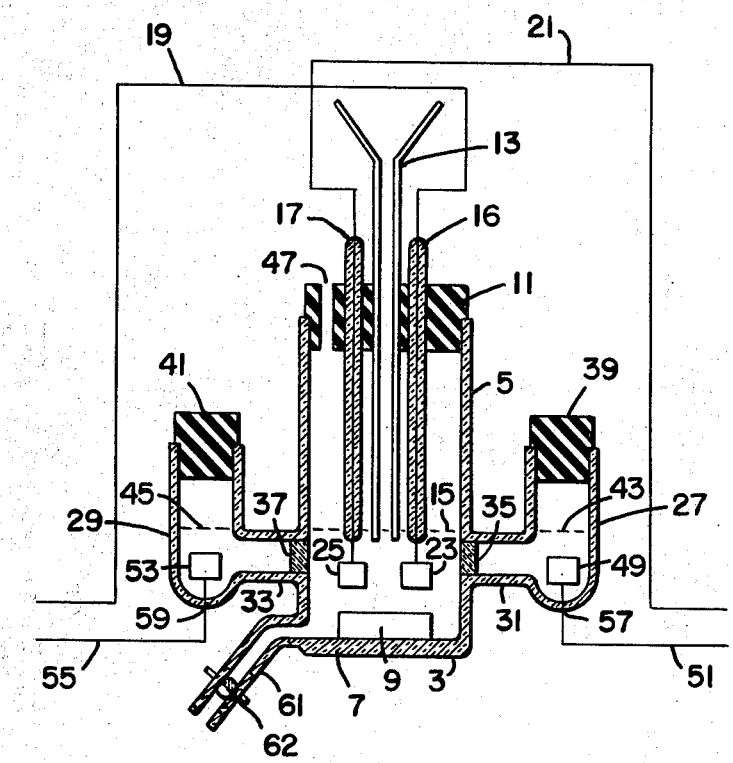
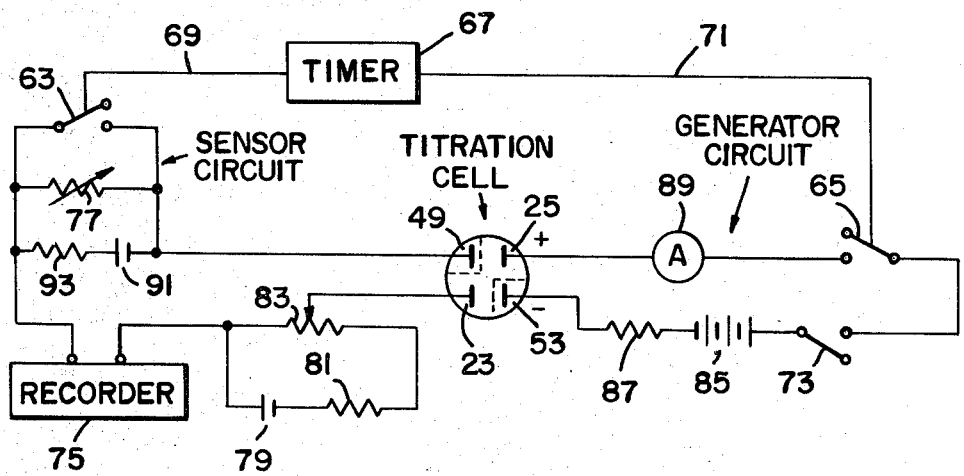
FIG_2

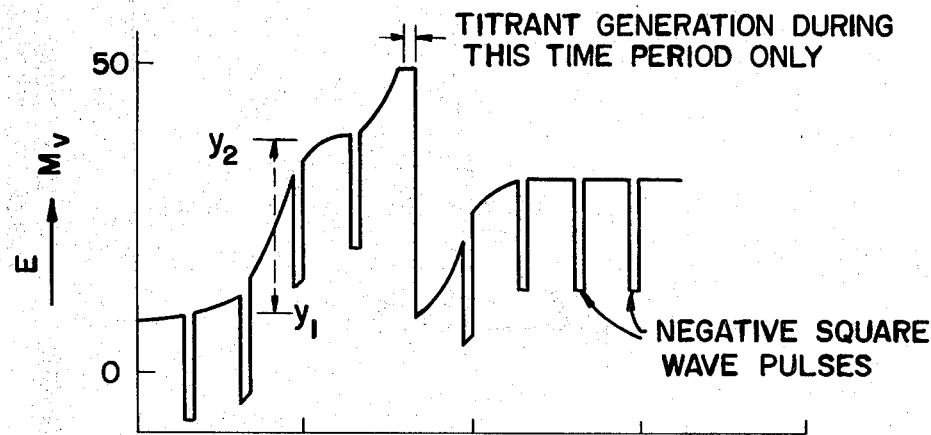
FIG_3a
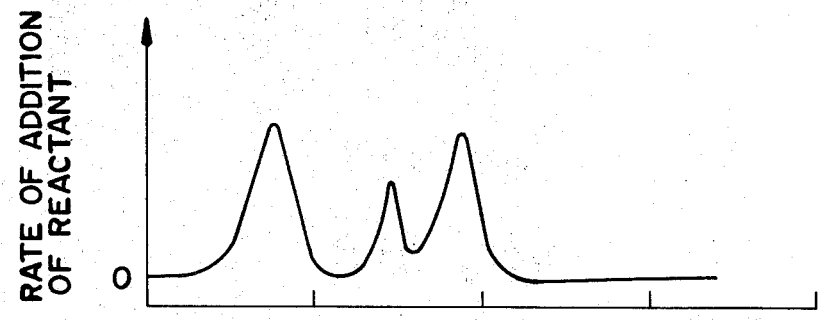
FIG_3b
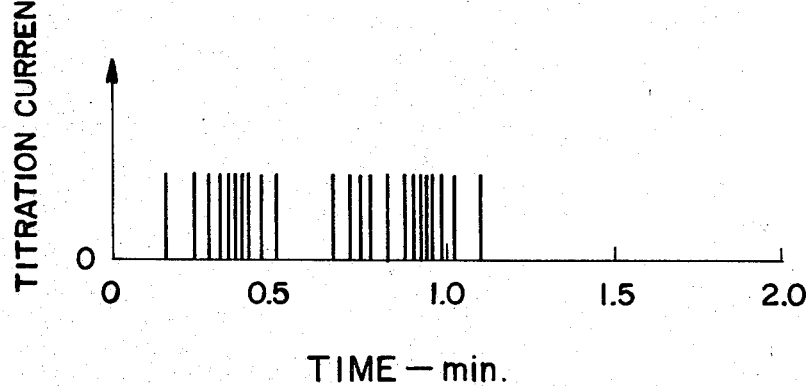
FIG_3c
INVENTOR.
DALE M. COULSON

United States Patent Office 3,563,875
Patented Feb. 16, 1971

3,563,875
APPARATUS FOR COULOMETRIC TITRATION
Dale M. Coulson, 884 Colorado Ave.,
Palo Alto, Calif. 94303
Filed Apr. 2, 1968, Ser. No. 718,100
Int. Cl. G01n 27/44
U.S. Cl. 204—195  3 Claims

ABSTRACT OF THE DISCLOSURE

Apparatus and method for semi-automatic coulometric titration by continuously monitoring a potential of a sensor electrode in an electrolytic solution into which a reactant is introduced, adding a predetermined amount of titrant when the potential reaches a preselected value and preventing incomplete addition of titrant by superimposing at regular intervals a negative wave pulse onto the potential being monitored.

BACKGROUND OF THE INVENTION

Field of the invention

Electrochemical generation of a titrant in a solution for the precise determination of the amount of various chemicals, as evidenced by the formation of chloride ions or certain metal ions, has found wide use in analytical chemistry. In this method of analysis, known as coulometry, the exact amount of titrant needed to reach the end point of a titration is generated in a solution by passing an electric current through a system composed of two generator electrodes immersed in a solution of electrolyte, a vessel for containing said electrolyte, a D.C.-source of electric current, a means for observing how far the titration reaction has proceeded, and a means for measuring the current-time factor or the number of coulombs required in the titration.

Coulometry is a particularly promising method for the monitoring of minute traces of materials. For example, a material in a sample can be extracted or isolated by other means and then separated into its constituents by vapor phase chromotography. As a constituent comes off the column, it can be burned to simple compounds, e.g., hydrogen chloride from a chlorine containing substance, and the hydrogen chloride introduced into the coulometric titration cell. An accurate coulometric method can detect as little as $10^{-9}$ g. of chloride. The amounts of materials containing elements other than chlorine can also be determined, when the material can be transformed into product which can be detected potentiometrically.

Description of the prior art

Coulson et al. in "Analytical Chemistry," 32, 1245 (1960) reported a titration cell for the continuous and automatic titration of chloride by silver coulometry. The use of this method embodied in an apparatus for determination of chloride as well as other titratable reactants is disclosed in U.S. Pat. No. 3,032,493, issued May 1, 1962.

The apparatus achieves a high degree of sensitivity by using a special configuration of titrant generating- and sensing-electrodes in order to avoid interaction between the IR-drop field of the generator electrodes and the electro-chemical potential of the sensor.

In order to avoid the IR-drop field of the generator electrodes from causing an error signal to be superimposed on the sensor electrode potential, the sensor electrode is placed in certain selected volume elements in the titration cell. Consequently, it is difficult and expensive to fabricate such titration cells. Also, the cells are particularly sensitive to mechanical shock or maltreatment which might affect the geometry of the electrodes.

SUMMARY OF THE INVENTION

Method and apparatus for coulometrically monitoring, either continuously or batchwise, a reactant capable of electrolytic titration, which comprises: means for determining the potential of a sensor electrode in an electrolytic solution; means for introducing reactant into the electrolytic solution; means for introducing titrant into the electrolytic solution; means for recording the change of potential as the reactant or titrant are introduced into the electrolytic solution; means for supplying a predetermined amount of titrant to said electrolytic solution when the potential reaches a preselected value; and, means to prevent variation in the amount of titrant added by allowing titrant to be added only at preselected intervals and imposing a negative potential on the sensing circuit during the time interval when titrant could be added.

BRIEF DESCRIPTION OF THE DRAWINGS

FIG. 1 gives an enlarged sectional view of a titration cell that may be used in this type of potentiometric apparatus.

FIG. 2 is the associated circuitry in schematic form to be used in conjunction with the titration cell.

FIGS. 3a-c illustrate curves which can be obtained by the use of the method and apparatus of this invention. Curves a and c indicate curves which would be obtained on a recording device, with the rate of addition of reactant as indicated by curve b.

DESCRIPTION OF THE PREFERRED EMBODIMENTS

In general, the titration apparatus comprises a vessel having a central cell and two side arms, the side arms opening to the central cell, but communication being interrupted by suitable means such as fritted discs. Closing members are fitted into the central cell and side arms, which provide supports for, in the central cell, a generating electrode and a sensor electrode, while, in one side arm, the reference electrode, and in the other, the companion generating electrode. Means are provided for introducing titrant and reactant and for cleaning the cell.

Circuitry associated with the electrodes provides substantially continuous recordation of the potential in the central cell. Only at regular intervals is a predetermined amount of titrant permitted to be introduced into the electrolyte solution. But the titrant is introduced during the interval, only when the potential of the reference electrode reaches a preselected value.

More particularly, the electrolytic cell utilized in the electrolytic titration apparatus as shown in FIG. 1 includes means for containing an electrolyte and defining a reaction zone for carrying out the titration process. This means is shown in the form of a substantially cylindrical vessel 3, but if desired, the vessel may be of any size and shape. As shown in the drawing, the vessel 3 is a glass cylinder 5 having a flat bottom wall 7 so that it is particularly adapted for use with a magnetic stirrer 9. The smooth surface of the bottom wall 7 permits the magnetic stirrer 9 to spin freely while in the rotating field of a magnet which is not shown. The cell 3 is provided with a cap 11. Passing through the cap 11 and supported therein is a reactant addition tube 13, which extends below the level 15 of the electrolytic solution, through which the reactant may be introduced, either continuously or batchwise.

Glass insulators 16 and 17 supported by the cap 11 support the electrode leads 19 and 21, respectively, which connect to the sensor electrode 23 and the generator anode 25, respectively, in the reaction zone. The glass insulators extend down to or through the surface 15 of the electrolytic solution. The sensor electrode 23 and generator anode 25 are completely immersed in the electrolytic solution in the reaction zone 1.

Two diametrically situated side arms 27 and 29 are mounted on the side walls of the vessel 3 in the form of glass cylindrical members which have their lower ends connected to the lower portion of the vessel 3 by connecting tubes 31 and 33, respectively. Mixing of electrolyte between the side arms is restricted or inhibited by suitable means, such as coarse glass fritted discs 35 and 37. The upper open ends of the side arms 27 and 29 are conveniently closed by such means as rubber stoppers 39 and 41. The levels 43 and 45 of the electrolytic solutions in the side arms 27 and 29 are at the same level as the level 15 in the reaction zone, the levels being high enough to completely cover the fritted discs 35 and 37. An opening 47 is provided in the central stopper 11 to release any gas which may be formed or any undissolved gas from samples introduced through tube 13.

In the reference electrode containing side arm 27, the reference electrode 49 is connected to lead 51, while in the generator cathode containing side arm 29, the cathode 53 is connected to lead 55. The leads 51 and 55 pass through the side arms 27 and 29 and are integrally held in the walls 57 and 59.

A drain tube 61 is provided, fitted with a stopcock 62 for draining the cell and adjusting the level of solution in the reaction zone.

The sensing electrode can be conveniently used in the form of a small spiral of silver wire coated with a suitable material such as silver chloride or it may be a glass electrode or any other electrode which is sensitive to a change in composition of the solution. Depending on the particular use, the material to be titrated and the electrolytic solution, one or the other sensing electrodes will be preferable. The reference electrode is conveniently a calomel cell, although other reference electrodes can be used.

The generating electrodes can be of any suitable material, such as platinum. However, instead of electrolytically generating titrant, titrant can be introduced by means of a buret, when the volume of the electrolytic solution will not be significantly changed so as to change the concentration and sensor electrode potential in the electrolytic solution by virtue of the change in volume. This could be achieved by using a gas, for example, as the titrant, or when the total volume of titrant added is small compared to the volume of the electrolyte solution.

The associated circuitry for use with the titration cell is shown in FIG. 2. Two open/close switches 63 and 65 are provided, the former in the sensor circuit and the latter in the generator circuit. The switches 63 and 65 are driven by a timer 67 connected through leads 69 and 71, respectively. Usually, the timer 67 will provide a time signal that causes the sensor circuit (s.c.) switch 63 to close for 1 or 2 seconds while the generator circuit (g.c.) switch 65 is open and alternatively causes the s.c. switch 63 to open for 5 to 10 seconds while the g.c. switch 65 is closed. That is, the sensor circuit is closed for a period which is long compared to the period for which the generator circuit is partially closed by the g.c. switch 65. In order for titration to occur as a result of current flow through the generating electrodes 49 and 53, it is necessary that both the g.c. switch 65 and the limit switch 73 are closed. The limit switch 73 is a switch that is mounted on the end of the pen carriage of the recorder 75 and is normally open, but is caused to close when the recorder pen carriage reaches the end of its travel. Any suitable potentiometric means may be used to close the limit switch 73. As will be explained subsequently, the signal generated across the variable 5K ohm resistor 77 keeps the titrator from starting a titration at all times except at the instant when the g.c. swich 65 closes. In this manner, exactly the same amount of titrant is introduced per on-cycle.

As previously indicated, titrant could be added by means of a solenoid controlled buret as an alternative to coulometric generation of titrant. In the buret method, electrodes 25 and 53 and their associated circuitry could be replaced with a buret that would deliver equal increments of titrant each time that the solenoid is activated by the limit switch 73 on the recorder 75 in cooperation with the g.c. switch 5.

A battery 79, a resistor 81 and a ten-turn potentiometer 83 serve as an electrical bias circuit to produce a correct voltage to balance out the potential difference between the reference electrode 49 and the sensor electrode 23. In this way, the potential changes at the sensor electrode 23 may be monitored directly on a 1, 10, 50 or 100 millivolt strip chart recorder 75 that has a high impedance input. The bias voltage selected in a particular potentiometric determination must be selected properly to give the greatest possible changes in the sensor electrode potential resulting from small amounts of reactant or titrant.

The coulometric titrant generator circuit is composed of a limit switch 73 that is usually open, a battery 85, a current limiting resistor 87 (the value of which should be chosen to give the desired rate of titrant generation through the generating electrodes 25 and 53) an open/close switch 65 which is operated by the timer 67 and a rapidly responding ammeter 89 that has a low impedance, such as 15 ohms, for monitoring the current during the coulometric generation cycles.

In addition to the bias voltage in the sensor circuit, a smaller intermittent voltage is introduced by means of a battery 91, a resistor 93 and an open/close switch 63 which is driven by the timer 67. This voltage varies between zero, when the s.c. switch 63 is closed during potential measurements, and 5 to 10 millivolts, when the s.c. switch 63 is open, which is during the time when the g.c. switch 65 is closed. The opening of the s.c. switch 63 results in negative square wave pulses.

The square wave pulses prevent the introduction of titrant subsequent to the time when the g.c. switch 65 has closed and before it has opened. By moving the recorder pen downward by means of the negative potential imposed on the circuit, the addition of retactant during the time when the g.c. switch 65 is closed will not cause the recorder pen to reach the end of its travel. Thus, the limit switch 73 will not close causing generation of titrant. During the interval when the s.c. switch 63 is closed, if the pen is at the upper end of its travel, it will remain there and titrant will be generated during the next time interval when the g.c. switch 65 is closed. The IR-drop field from the generator electrodes imposes a positive square wave potential on the sensor electrodes larger than the negative square wave potential caused by closing the s.c. switch 63. Therefore, the recorder pen will not travel downward while titrant is generated. The voltage for the negative square wave potential should be chosen so that the rate of addition of reactant to the electrolytic cell will not overtake the negative potential imposed and result in the addition of titrant during the time interval when the generator circuit switch 65 is closed.

In other words, the generator current will cause a sufficiently high potential in the electrolyte solution, so that the recorder pen will remain at the terminal position. Therefore, until titrant generation stops, the recorder pen switch will remain closed. If titrant is added by means of a buret, other means such as a mechanical timer can be used to initiate and to regulate the addition of titrant.

Any determination in which a reactant or product of reaction can be detected potentiometrically may be carried out with this apparatus. For example, chloride may be detected with a silver sensor electrode and titrant may be generated by a silver anode. In this case, the reference electrode may be a silver/silver chloride electrode or any other similar electrode that can be used in the electrolyte system that is used in the titration cell. The generator cathode is preferably a noble metal such as platinum or gold, although other materials such as graphite, iron, copper, mercury and lead can be used.

An electrolytic solution is provided with glacial acetic acid containing 10 to 30 percent of water. The side arms 27 and 29 similarly contain aqueous acetic acid. If desired, an alternative electrolyte may be used. The bias imposed by battery 79 and resistors 81 and 83 is chosen so that a silver ion concentration of approximately $10^{-7}$ molar in the reaction zone 1 occurs with the recorder pen half way up the scale. This value would be 250 millivolts measured against a silver/silver acetate (sat.) electrode in this electrolyte.

Now let it be assumed that the fluid stream containing the sample to be titrated is passed through tube 13 into the electrolyte in the reacion zone 1. In the case of a gas stream, excess inert gas similar to the sample carrier may be added to the main gas stream to ensure rapid and complete introduction of the sample into the cell. This higher rate of flow reduces the possibility of the electrolyte or the solution in the reaction chamber from backing up into the sample entry tube. Also, in this manner, sample holdup on the wetted surface of the tube 13 is substantially reduced, if not prevented.

As the sample enters the reaction chamber, e.g., as hydrogen chloride, it goes into the solution to produce a change in the potential between the sensing electrode 23 and the reference electrode 49. This change of potential causes the sensing electrode to produce a signal on the recorder 75. Assuming the s.c. switch 63 is closed, the pen would respond to the change in potential, moving up the scale as shown in FIG. 3a. At intervals, the timer would open the s.c. switch 63 and close the g.c. switch 65, and the negative potential resulting from the circuitry associated with the bias battery 91 would provide the negative square wave pulses.

Assuming the addition of chloride reactant followed the curve portrayed in FIG. 3b, the pen would continue to move up across the sheet following the first addition of chloride as indicated by the first peak in FIG. 3b. Up to this time, there would be no generation of titrant. When the further addition of chloride occurs as indicated by the second peak of the curve in FIG. 3b, the pen would move to the end of its travel closing the limit switch 73. No titrant will be generated while the s.c. switch 63 is closed and the g.c. switch 65 is open. When the timer 67 opens the s.c. switch 63 and closes the g.c. switch 65, a predetermined amount of titrant will be generated.

In many instances, the amount of titratable substance is nearly proportional to the change in sensor electrode potential over a range in some cases of as much as 60 millivolts, if the correct bias voltage is chosen for the titration being formed. Referring to FIG. 3a, the amount of material represented by the first peak in FIG. 3b is proportional to the distance $Y_1$ to $Y_2$. The amounts of material represented by subsequent peaks would be measured in a similar manner.

If the increments of titrant are made diminishingly smaller by decreasing the time period during which the g.c. switch 65 is closed, the subject apparatus can be caused to operate as a coulometric titrator that maintains an essentially constant level of titrant in the titration compartment. In this method of operation, square wave titrant generation peaks occur as often as is necessary just to maintain the sensor electrode potential, measured between titrant additions, at the desired and preselected level. In this method of operation, the frequency of titrant generation peaks is proportional to the rate of introduction of titratable substances. By plotting titration current versus time, one obtains the graph in FIG. 3c as a variation in density related to the variation in amplitude of FIG. 3b.

The system could be used to continuously monitor gas or liquid streams containing titratable substances. The graph in FIG. 3c demonstrates the type of results that would be observed by simply recording the times at which equal increments of titant were added for a simple introduced into the titration zone in the manner shown in FIG. 3b.

A common advantage of the potentiometric methods of titration according to this invention is that the results are recorded in an inegral manner. This eliminates the need for an integrator attachment on the strip chart recorder resulting in a significant savings in equipment costs and simplifies the interpretation of results.

The apparatus in accordance with this invention can find application in connection with the potentiometric, coulometric, and combined potentiometric and coulometric examination, measurement and analysis of substances in liquid and gas streams. As previously indicated, it is particularly well suited for the measurement in analysis of components eluted from a gas chromatograph fitted with a combustion apparatus between the gas chromatograph and the detector. Examples of such analysis are the examination of extracts of food products for chlorinated organic pesticide chemical residues and the examination of petroleum fractions for sulfur-containing compounds. Various other materials may be determined by varying the electrodes as described in the aforementioned U.S. Pat. No. 3,032,493.

As will be evident to those skilled in the art, various modifications on this invention can be made or followed, in the light of the foregoing disclosure and discussion, without departing from the spirit or scope of the disclosure or from the scope of the following claims.

What is claimed is:

1. In an electrochemical titration apparatus, the improvement comprising:
    (a) means for containing an electrolyte forming a reaction zone,
    (b) a sensing pair of electrodes in said reaction zone,
    (c) means for introducing a reactant into said electrolyte.
    (d) monitoring means attached to said sensing electrodes for sensing the electrode potential in said electrolyte,
    (e) means for introducing preselected small, fixed amounts of titrant into said reaction zone,
    (f) said means for introducing titrant in small, fixed amounts including a timer, said timer being adapted to run continuously and being adapted to actuate periodically a first circuit connected to said titrant introduction means,
    (g) a second circuit between said sensing means and said titrant introduction means so that said sensing means can prevent introduction of titrant, whereby
    (h) both first and second circuits must be actuated to cause the introduction of titrant.

2. The apparatus of claim 1 wherein said titrant introduction means includes means for generating titrant by electrolysis within said reaction zone.

3. The apparatus of claim 2 wherein said timer circuit introduces a negative pulse in said reaction zone at the time said generator circuit is actuated whereby a change in potential during generation of titrant will not stop the generation of said titrant.

References Cited

UNITED STATES PATENTS

| | | | |
|---|---|---|---|
| 3,032,493 | 5/1962 | Coulson et al. | 204—195 |
| 3,073,682 | 1/1963 | Lindsley | 23—230 |
| 3,162,585 | 12/1964 | De Ford et al. | 204—195 |
| 3,408,269 | 10/1968 | Hersch | 204—1.1 |

TA-HSUNG TUNG, Primary Examiner

U.S. Cl. X.R.

23—230, 253; 204—1